Sept. 11, 1962   S. E. FARMER ETAL   3,053,596
PISTON AND SEAL CONSTRUCTION
Filed May 27, 1960
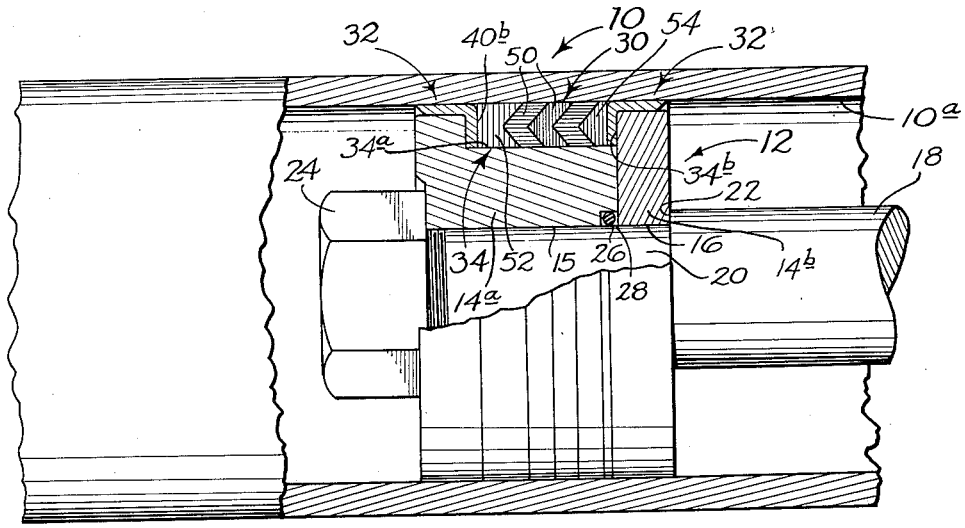
*Fig. 1.*
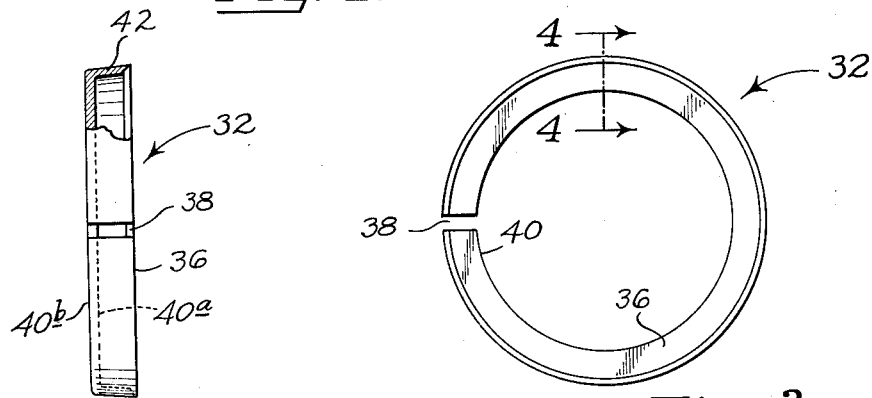
*Fig. 2.*   *Fig. 3.*
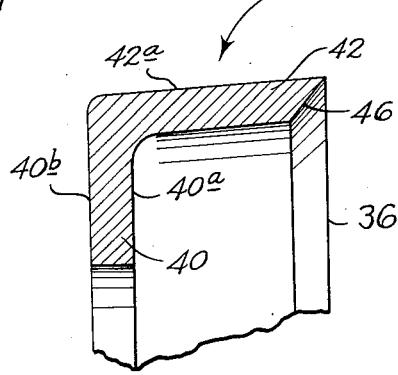
*Fig. 4.*
Stanley E. Farmer
Zouhdi M. Derhalli
INVENTORS
BY Ramsey and Kolisch
Attys.

United States Patent Office 3,053,596
Patented Sept. 11, 1962

3,053,596
PISTON AND SEAL CONSTRUCTION
Stanley E. Farmer and Zouhdi M. Derhalli, Portland, Oreg., assignors to Cascade Manufacturing Co., Portland, Oreg., a corporation of Oregon
Filed May 27, 1960, Ser. No. 32,450
7 Claims. (Cl. 309—52)

This invention relates to a piston and seal, and more particularly to a novel construction for a piston with sealing means about its circumference which features a rider of bearing material disposed in advance of the sealing means as the piston moves through a cylinder, providing the bearing surface for the piston and at the same time serving to wipe the inner wall of the cylinder so as to minimize wear.

In a piston and cylinder combination, leakage between the two sides of the piston, and wear and scoring, are continuing problems. Considerable work and experimentation have been conducted in an effort to perfect pistons and their seals. Ordinarily a piston is provided with some sort of bearing surface, that centers the piston in a cylinder, and a sealing means alongside the bearing surface inhibiting leakage. Disadvantages of known constructions include the fact that in many designs the sealing means is located toward the rear of the bearing surface as the piston advances during a stroke, and particles that collect on the cylinder wall tend to be picked up by the bearing surface and produce scoring. Most bearing surfaces have chamfered edges to enable the piston to ride freely, and these chamfered edges are a contributing factor in piston scoring, as they tend to funnel particles directly between the bearing surface and cylinder wall. In other constructions, a sealing means may be placed on either side of the bearing surface, so that some type of wiping action can take place before the bearing surface moves over a cylinder wall. However, this severely limits the type of sealing means that may be employed. For instance, the sealing means itself must be resistant to abrasion, and multiple lip seals, such as "chevron" rings, are not readily employed without substantially increasing the size of the piston.

A general object of this invention is to provide a piston and seal construction which takes care of the above-discussed problems in a highly practical and satisfactory manner.

A more specific object is to provide a piston and seal construction which includes a piston and sealing means about the circumference thereof, and a rider mounted on the piston in advance of the sealing means as the same travels during a stroke providing a bearing surface for the piston, such rider being of a bearing material that is pliable and substantially permanently resilient. The rider in its natural state and outside of the cylinder has a flared skirt portion terminating in an edge of greater diameter than the diameter of the cylinder with which it is used. The rider may be thought of as having a built-in "interference." With the rider on a piston and in a cylinder, the skirt is deformed against its natural resiliency, and the tendency of the skirt to seek to return to its natural shape produces a superior type of wiping action which protects the rider and cylinder wall from scoring. The wiping action also protects the sealing means used.

Another object is to provide a piston and seal construction which comprises a rider of the above description mounted on the piston in such a manner as to prevent extrusion of the sealing means on the piston, which would impair operation of the sealing means.

Another general object is to provide a rider for a piston that takes the form of a ring of pliable and substantially permanently resilient bearing material, having in its natural state a flange projecting radially inwardly of the rider and an annular skirt projecting axially from the flange and flaring outwardly progressing from the flange, said skirt assuming a cylindrical shape when mounted on a piston inside a cylinder and serving as a bearing portion for the piston.

In a preferred embodiment it is contemplated that the rider be a split nylon ring, having an axially projecting annular skirt integral with the flange shaped as the frustum of a hollow, right-circular cone, and terminating in an end edge that is under-beveled relative to the outer surface of the skirt, whereby the end edge may best wipe clear the inner wall of a cylinder.

Other objects and advantages are attained by the invention, which is described hereinbelow in conjunction with the accompanying drawings, wherein:

FIG. 1 illustrates portions of a piston and cylinder combination, with portions broken away to illustrate details of construction;

FIG. 2 illustrates a rider employed in the piston and cylinder combination in FIG. 1, with the rider removed from the piston and cylinder, and shown in its natural shape without being deformed by the cylinder;

FIG. 3 is an end view of the rider illustrated in FIG. 2; and

FIG. 4 is a section view, slightly enlarged, taken along the line 4—4 in FIG. 3.

Referring now to the drawings, and more particularly to FIG. 1, 10 indicates generally a cylinder, and 12 a piston mounted for reciprocation within cylinder 10. Piston 12 comprises parts 14a and 14b having cylindrical bores 15, and 16, respectively, extending axially through their centers. Parts 14a and 14b are mounted on the end of a piston rod 18, that has a reduced stem portion 20 fitting within bores 15, 16. The piston is fixed against axial shifting on the piston rod by shoulder 22 on the right side of part 14b in FIG. 1, and nut 24 screwed onto a threaded portion of stem 20 and to the left side of part 14a in FIG. 1. Sealing stem portion 20 to the piston is an O ring 26 mounted within a shelf 28 provided part 14a.

Piston 12 is sealed to inner wall 10a of cylinder 10 by a sealing means indicated generally at 30. The piston is centered within the cylinder by a pair of riders 32, disposed on either side of sealing means 30. As will be described, these riders not only provide bearing surfaces centering the piston, but also function to wipe wall 10a of the cylinder as the piston moves through the cylinder.

Riders 32 and sealing means 30 are mounted on the piston by seating them in an annular groove 34 (substantially rectangular in cross section) defined by annular shelf 34a of part 14a and wall portion 34b of part 14b. In assembling the piston, sealing means 30 and the riders are first properly positioned, and parts 14a, 14b are then brought together and secured or rod 18 using nut 24.

With reference now more particularly to FIGS. 2, 3, and 4, each rider 32 in its natural state takes the form of a ring 36 of bearing material, such bearing material being pliable and substantially permanently resilient. In a preferred embodiment, the ring is made of nylon, as this material has the permanently resilient and pliable characteristics desired. Nylon also has a low coefficient of sliding friction in the organization contemplated. Ring 36 is split at 38, since nylon has a tendency to expand on a rise in temperature, and a split ring better can accommodate this expansion.

Further describing the rider, 40 indicates an annular flange portion or heel, that extends radially inwardly of the rider. Flange portion 40 has flat sides 40a and 40b. The flange portion functions as a means for anchoring the rider in place. Joined to flange portion 40 and integral with its outer margin is a flaring skirt portion 42. This is shaped as the frustum of a hollow, right-circular cone. The apex of the cone is integral with the flange portion, so that outer surface 42a flares outwardly progressing axially away from the flange portion. Outer surface 42a is straight in an axial direction. The flare of the skirt in the usual construction may range from about two to four degrees. The flared skirt gives the rider a molded-in, or preset interference, since the rider is used with a cylinder having an inner diameter equal about to the diameter of the heel. The pliable, resilient character of the bearing material enables the skirt to swing about its connection with the heel, and be compressed, so that when mounted in a cylinder, the skirt assumes a substantially cylindrical shape. In this condition, the rider exerts a radially outward pressure on cylinder wall 10a, and this pressure is greatest near the end of the skirt away from flange portion 40.

Continuing with the description of the rider, skirt 42 terminates at the end away from the flange portion in an edge 46 tht is underbeveled relative to outer surface 42a. The underbevel produces a sharp edge where the end of the skirt rides against the inner wall of a cylinder. An underbevel angle of about 45° has been found highly satisfactory.

Sealing means 30 in the embodiment illustrated comprises rings 50 having chevron-shaped cross sections, and the usual adapters 52, 54 constituting backings for the rings. The outer sides of the adapters fit snugly against sides 40b of the riders. The outer margins of sides 40b are snugly adjacent wall 10a of the cylinder, and inhibit extrusion of the sealing means.

With the riders mounted on the piston inside cylinder 10 the flat surfaces 42a of the skirts extend snugly along wall 10a. During cycling of the piston, edges 46 wipe wall 10a, and clear particles away so that they are prevented from scoring. Surfaces 42a function as bearing surfaces, and the inner surfaces of the skirts rest directly on the piston. Sealing means 30 rides over wall 10a only after it has been cleared of particles.

There has been described herein an embodiment of the invention, and certain preferences in construction. It is appreciaed that variations may be made, however, without departing from the invention. It is desired not to be limited to the specific construction disclosed, but to cover all modifications and variations apparent to those skilled in the art and coming within the scope of the appended claims.

It is claimed and desired to secure by Letters Patent:

1. For a cylinder, a piston and seal construction to be mounted in the cylinder comprising a piston head, fluid pressure expanded sealing means about the circumference of the piston head for sealing the same to the inner wall of the cylinder, and a rider on each side of said sealing means mounted on the piston head and having an outer surface providing a bearing surface for the piston head, said surface having a nonsealed relationship with respect to the cylinder, each rider comprising a ring of bearing material that is pliable and substantially permanently resilient, each rider having a heel portion extending radially inwardly and held securely on the piston head, and a nonsealing skirt integral with the outer margin of said heel portion extending axially away from said heel portion and sealing means and with an outer surface that flares outwardly progressing from said heel portion, the diameter of said outer surface at the end of the skirt away from said heel portion being greater than the diameter of the inner wall of the cylinder, the resilient and pliable nature of the bearing material enabling the skirt to have a substantially cylindrical shape with the piston head and sealing means mounted within a cylinder.

2. The piston and seal construction of claim 1 wherein said skirt terminates at the end thereof away from said heel portion in an edge that is underbeveled relative to the outer surface of the skirt.

3. For a cylinder, a piston and seal construction to be mounted in the cylinder comprising a piston head, fluid pressure expanded sealing means about the circumference of the piston head for sealing the same to the inner wall of the cylinder, and a rider to one side of said sealing means providing a bearing surface for the piston head, said surface having a nonsealed relationship with respect to the cylinder, said rider comprising a split nylon ring that is pliable and substantially permanently resilient, said rider having a heel portion extending radially inwardly and held securely on the piston head, and a nonsealing skirt integral with the outer margin of said heel portion extending axially from said heel portion and sealing means, said skirt having an outer surface that flares outwardly progressing axially from said heel portion and said outer surface having a diameter at the end of said skirt away from said heel portion that is greater than the diameter of the inner wall of the cylinder, the resilient and pliable nature of the nylon enabling the skirt to have a substantially cylindrical shape with the piston head and sealing means mounted within a cylinder, said skirt terminating at the end thereof away from said heel portion in an edge that is underbeveled relative to the outer surface of the skirt.

4. In a piston and cylinder combination, an annular groove formed about the perimeter of the piston substantially rectangular in cross-sectional outline, a rider of bearing material that is pliable and substantially permanently resilient and having a flange and a skirt that define an L-shaped cross-sectional outline for the rider mounted along each side of said groove, the flange of each rider resting in the groove and the skirt of each rider extending axially away from the flange and over and resting on the piston directly adjacent the groove, each skirt having an outer cylindrical surface in nonsealing engagement with the cylinder that is a bearing surface for the piston and an outer edge that is underbeveled relative to the outer surface of the skirt, and fluid pressure expanded sealing means mounted within the groove bounded on opposite sides by the sides of the rider flanges, each skirt being stressed within the cylinder as a result of deformation from a shape that each has without stressing where its outer cylindrical surface is shaped as a conical frustum with a flare outwardly progressing axially from its flange, said skirts wiping the cylinder in advance of said sealing means.

5. For a cylinder, a piston and seal construction to be mounted in the cylinder comprising a piston head, fluid pressure expanded sealing means about the circumference of the piston head for sealing the head to the inside of the cylinder, and a rider to one side of said sealing means providing a bearing surface for the piston head, said surface having a nonsealed relationship with respect to the cylinder, said rider comprising a ring of bearing material that is pliable and substantially permanently resilient, said rider having a heel portion extending radially inwardly and held securely on the piston head, and a nonsealing skirt joined with the outer margin of said heel portion extending axially from the heel portion and sealing means, said skirt having an outer surface that flares outwardly progressing axially from said heel portion and said outer surface having a diameter at the end of said skirt away from the heel portion that is greater than the diameter of the inside of the cylinder, the resilient and pliable nature of the bearing material enabling the skirt to have a substantially cylindrical shape with the piston head mounted within a cylinder through bending of the skirt relative to the heel portion where it is joined to the heel portion.

6. For use with a cylinder; a piston having an annular channel extending around the circumference thereof; a fluid pressure expanded sealing assembly mounted within said channel including a ring of packing material for providing a seal with the cylinder, and on each side of the packing material a continuous annular backing for the packing material; and a rider on each side of said sealing assembly separate from the sealing assembly and providing a bearing surface for the piston; said surface having a nonsealed relationship with respect to the cylinder, said rider comprising a ring split in an axial direction so as to be noncontinuous and made of a bearing material; said rider including a heel portion extending radially inwardly into said channel between said sealing assembly and an adjacent side of said channel, and a nonsealing skirt joined with the outer margin of said heel portion extending axially from the heel portion in a direction away from said sealing assembly; said skirt overlying portions of said piston to one side of said channel.

7. For use with a cylinder; a piston having an annular channel extending around the circumference thereof; a fluid pressure expanded sealing assembly mounted within said channel including a ring of packing material for providing a seal with the cylinder, and on each side of the packing material a continuous annular backing for the packing material; and a rider on each side of said sealing assembly separate from the sealing assembly and providing a bearing surface for the piston with such surface in nonsealed relationship with respect to the cylinder; said rider comprising a ring split in an axial direction so as to be noncontinuous and made of a bearing material that is pliable and substantially permanently resilient; said rider including a heel portion extending radially inwardly into said channel between said sealing assembly and an adjacent side of said channel, and a nonsealing skirt joined with the outer margin of said heel portion extending axially from the heel portion in a direction away from said sealing assembly; said skirt overlying portions of said piston to one side of said channel and having an outer surface that flares outwardly progressing axially from said heel portion; said outer surface having a diameter at the end of said skirt away from said heel portion that is greater than the diameter of the inside of the cylinder; the resilient and pliable nature of said bearing material enabling said skirt to have a substantially cylindrical shape with the piston mounted within the cylinder through bending of said skirt relative to said heel portion where it is joined to said heel portion.

References Cited in the file of this patent

UNITED STATES PATENTS

| | | |
|---|---|---|
| 743,179 | Meehan | Nov. 3, 1903 |
| 1,746,733 | Lamb | Feb. 11, 1930 |
| 2,417,840 | Rodgers et al. | Mar. 25, 1947 |
| 2,701,172 | Koester | Feb. 1, 1955 |
| 2,757,993 | Flick | Aug. 7, 1956 |
| 2,757,994 | Snyder | Aug. 7, 1956 |